(12) United States Patent
Torres

(10) Patent No.: US 8,266,159 B2
(45) Date of Patent: Sep. 11, 2012

(54) SYSTEM AND METHOD FOR PROVIDING ACCESS TO LOG DATA FILES

(75) Inventor: Marc Torres, Scottsdale, AZ (US)

(73) Assignee: Benchworkzz, LLC, Austin, TX (US)

( * ) Notice: Subject to any disclaimer, the term of this patent is extended or adjusted under 35 U.S.C. 154(b) by 338 days.

(21) Appl. No.: 12/543,453

(22) Filed: Aug. 18, 2009

(65) Prior Publication Data

US 2011/0153616 A1    Jun. 23, 2011

(51) Int. Cl.
*G06F 17/30* (2006.01)
(52) U.S. Cl. ........................................ 707/752
(58) Field of Classification Search .................. 707/672, 707/673, 682, 696, 706, 723, 726, 741, 748, 707/752–754, 795, 805
See application file for complete search history.

(56) References Cited

U.S. PATENT DOCUMENTS

| | | | |
|---|---|---|---|
| 7,047,232 B1 | 5/2006 | Serrano | |
| 7,110,936 B2 | 9/2006 | Hiew et al. | |
| 7,340,715 B2 | 3/2008 | Liu | |
| 7,617,254 B2 * | 11/2009 | Loaiza et al. | 1/1 |
| 7,779,021 B1 * | 8/2010 | Smith et al. | 707/760 |
| 7,895,167 B2 * | 2/2011 | Berg et al. | 707/672 |
| 8,055,613 B1 * | 11/2011 | Mu et al. | 707/610 |
| 2002/0007483 A1 | 1/2002 | Lopez | |
| 2003/0115192 A1 | 6/2003 | Kil et al. | |
| 2004/0030954 A1 * | 2/2004 | Loaiza et al. | 714/20 |
| 2005/0273767 A1 | 12/2005 | Achiloptas et al. | |
| 2006/0184529 A1 | 8/2006 | Berg et al. | |
| 2006/0253790 A1 | 11/2006 | Ramarajan et al. | |
| 2007/0006041 A1 | 1/2007 | Brunswig et al. | |
| 2007/0168946 A1 | 7/2007 | Drissi et al. | |
| 2008/0172409 A1 * | 7/2008 | Botros et al. | 707/103 R |
| 2009/0089252 A1 * | 4/2009 | Galitsky et al. | 707/3 |

OTHER PUBLICATIONS

Stojanovic, Milorad, RTI International, "SAS(r) Log Summarizer—Finding What's Most Important in the SAS(r) Log", Retreived Aug. 8, 2009 from http://analytics.ncsu.edu/sesug/2008/cc-037.pdf.
Smoak, Carey G., Chiron Corporation, "A Utility Program for Checking SAS(r) Log Files", Retrieved Jul. 29, 2009 from http//www2.sas.com/proceedings/sugi27/p096-27.pdf.
Humphreys, Suzanne, Cardiome Pharma Corp, "%LOGCHECK: A Convenient Tool for Checking Multiple Log Files", Retrieved Jul. 29, 2009 from http//www.lexjansen.com/pharmasug/2008/cc/cc02.pdf.

* cited by examiner

*Primary Examiner* — Cam-Linh Nguyen
(74) *Attorney, Agent, or Firm* — The Jansson Firm; Pehr B. Jansson

(57) ABSTRACT

A system and method for providing a user with efficient access to a log data file. The system takes a computer generated log data file and applies a user defined filter criteria to the log data file. The indexed and filtered log data file is then displayed to the user in an application player where the user can interact with the log data file.

20 Claims, 13 Drawing Sheets

SYSTEM AND METHOD FOR PROVIDING ACCESS TO LOG DATA FILES

BACKGROUND OF THE INVENTION

The present invention relates generally to a system and method for providing access to log data files, and more particularly but not exclusively to a system for tracking specific events in the log data files based on user-defined search criteria.

Computer software programs can be very lengthy and complex, often requiring teams of programmers to write the code. Due to the complexity and length of the program source code, one of the biggest challenges faced by programmers is debugging. Debugging is the process of identifying and correcting errors within a computer program to ensure the program behaves as expected. For some programming systems, when a computer program is executed, a program execution log data file is generated. The program log data file may include a description of the execution results from each execution. The log data file typically includes execution error messages and warnings. Computer programmers use this log data file to assist in the debugging process.

Each computer language has its own program log data file format, however for the purpose of illustration we will discuss SAS®. SAS® is a business intelligence and analytics software system that uses a proprietary programming language. Typically used at the enterprise level, SAS® provides an organization with the ability to data mine and subsequently process the mined data into useful analytic and statistical data to further long range and strategic planning. The following terms will be used when discussing SAS®. A SAS® system is the actual software designed by the SAS® institute. A SAS® Application Program is an application program that has been developed to run on the SAS® system. A SAS® Log File is the program log data file created upon execution of a SAS® application program.

Due to the large volume of data typically processed with a SAS® application program, the log data files produced can be very extensive. A source code program with one hundred lines of actual SAS® code could produce a SAS® log file containing over a million lines of output thus making reviewing the log data file manually an impractical if not impossible task for a programmer, or even a team of programmers.

An additional difficulty for programmers writing a SAS® application program is that unlike other languages such as C++, Visual Basic and COBOL, SAS® does not halt the execution of the program when an error is encountered within the code. For example, in many other programming languages, when a division by zero occurs in the program code, the program immediately halts execution and throws a run time error, alerting the programmer that an error has occurred. However, the SAS® system functions differently. During execution of a SAS® program having a divide by zero, a character is inserted to replace the division by zero so that the program can continue to execute. Of course, this insertion usually causes incorrect output results.

Similarly, the SAS® system may read corrupt and missing data files, again replacing the corrupt or missing data with a placeholder and continue to execute the program. The result of these inserted characters is that the output data is inaccurate. While some other programming languages may have stopped the program execution upon encountering such conditions, the SAS® system does not. This aspect of the SAS® system adds an extra burden on the programmer to ensure the output data is in fact correct.

In addition to unexpected output results, the fact that SAS® application programs may continue to execute even after encountering anomalies excessive CPU time has been spent to compile and execute the SAS® application program without addressing the anomaly. Because the SAS® system will not stop the execution of a program even when errors are encountered, CPU time is spent to fully execute programs that otherwise could have been halted upon encountering the error. Thus, executing a SAS® application program that contains errors is a potential waste of CPU time and can be very costly to an organization.

As noted above, when a SAS® application program is executed with errors the output report may contain inaccurate data results. An organization may be using the data results in order to make important decisions. Inaccurate data, in this situation, could be disastrous.

At the present time, in order to ensure proper data output results the programmer has to manually review the SAS® log to debug the program code. The amount of time and effort required to completely and accurately interrogate the data for critical status events is prohibitive. Also, the assessment of these events is often incomplete or inaccurate often creating conditions whereby the integrity of the program results are compromised or repetitive programming is required to completely eliminate all negative status events thereby increasing the overall development cycle times and associated costs. Programmers, just like CPU time, are expensive resources. For a programmer to spend hours reviewing a SAS® log in order to correct errors instead of developing new code can be extremely inefficient.

There have been previous attempts to address the above-discussed problems. In the paper entitled "% LOGCHECK a Convenient Tool for Checking Multiple Log Files" by Suzanne Humphreys (Retrieved Jul. 29, 2009 from http*//www*lexjansen*com/pharmasug/2008/cc/cc02*pdf)[1], Humphreys presents a tool (LOGCHECK) for checking multiple log files and producing a summary report of the findings. LOGCHECK is a macro that can be used directly within the SAS® system. Another log checking utility program called Check Log is detailed in the paper entitled "A Utility Program for Checking SAS® Log Files" by Carey G. Smoak (Retrieved Jul. 29, 2009 from http*//www2*sas*com/proceedings/sugi27/p096-27*pdf.) The Check log program scans one or more SAS® log files for errors and warnings and then allows the user to print out a report of the findings. In the paper entitled "SAS® Log Summarizer—Finding what's most Important in the SAS® Log", (Retrieved Jul. 29, 2009 from http*//analytics*ncsu*edu/sesug/2008/CC-037*pdf) Milorad Stojanovic discloses a method similar to that of both Humphreys and Smoak. Stojanovic parses the SAS® log file in order to search for three keywords, ERROR, WARNING and NOTE. The ultimate goal of Stojanovic's program is to put the SAS® log messages into a hierarchy from severe to simply informative.

[1] In conformity with 37 CFR 1.57(d) which prohibits use of executable hyperlinks in patent documents, this document uses asterisks in lieu of periods in example hyperlinks. In actual practice, these asterisks would, of course, be periods While all of the aforementioned programs allow a user access to a report that highlights errors and warnings, they do not provide the user with interactive access to the log data file. Being able to interact with the log data file would provide a user focused and efficient access to the log data file saving time during the debugging process.

From the foregoing it will be apparent that there is still a need for a system and method to provide access to log data files and to provide a system that gives users real-time access to run time errors and warnings.

SUMMARY OF THE INVENTION

The present invention relates to a system and a method of operating a computer system to provide a user with access to a log data file created by execution of a computer program. The system for providing access to log data files begins with the loading of the log data file into the system. After the loading step the log data file is passed through a series of text parsing engines in order to create an indexed log data file. The indexed log data file is then passed through a final text parsing engine which creates an event list based on criteria defined by the user. The indexed log file provides a link between at least one event in the event list and the corresponding location of the event in the original log data file. The event list is then displayed to the user via an application player. The application player is a graphical user interface by which the user can interact with the event list through a series of hyperlinks.

In one embodiment of the system for providing access to log data files, the log data is a static log file meaning that the program creates the log file before the log data file is loaded into and analyzed by the system. In this embodiment, the user can review and interact with the log data files after the entire program has been executed.

In an alternate embodiment of the system for providing access to log data files, the log data is dynamically loaded and analyzed by the system for providing access to log data files, meaning that the log file is created by the program and loaded into the system for providing access to log data file and analyzed in near-real time in parallel with the creation of the log data file. The obvious advantage to processing in near-real time is that the system for providing access to log data files can detect errors as they occur in the program and can alert the user of the error as it occurs and the user can halt execution of the program if necessary.

In the alternate embodiment the user can be alerted by the system for providing access to log data file using short message service (SMS), by electronic mail and many other methods of notification. Once the alert has been sent to the user, the user can review the error or warning messages, correct the program code and re-execute the program. By processing in near-real time, CPU time as well as programmer time is used more efficiently as the user can stop the execution of the program upon encountering errors.

While the system for providing access to log data files can relate to multiple types of computer logs, for the purpose of illustration, SAS® logs created by a SAS® program are used to explain the system for providing access to log data files.

DETAILED DESCRIPTION OF THE INVENTION

Figure 1:
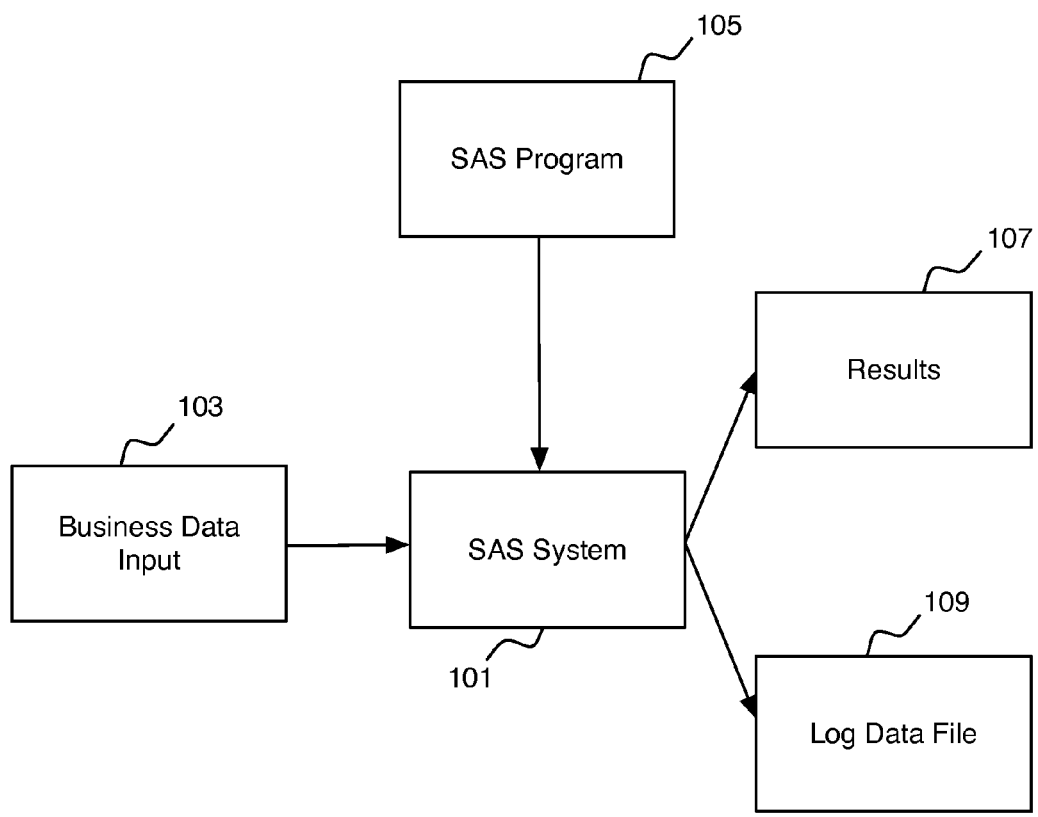
FIG. 1 is a high level diagram providing an illustrative example of an operating environment in which a SAS® application program is executed using the SAS® system thereby producing a log data file.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

As shown in the drawings for the purpose of illustration, the invention is embodied in a system and method for providing access to log data files. The system for providing access to log data files provides a method to enable a user to quickly and efficiently search for specific events within a lengthy log data file. Existing systems do not have a mechanism that allows the user to navigate the events within the log data file. The present system introduces an application player with which the user can easily navigate the log data file using a series of hyperlinks that correspond to event lines in the log data file. Using a XML file the application can be customized to specific preferences and requirements.

FIG. 1 is a high level diagram providing an illustrative example of an operating environment in which the system for providing access to log data files may be deployed. In order to add value to raw business data that has been mined from various sources, the data must be processed into information. While there are many ways to process raw data into useable information a SAS® system is discussed herein. SAS® is a business intelligence and analytics software system that uses a proprietary programming language. SAS® is typically used at an enterprise level by companies wishing to process very large amounts of raw business data.

Business data 103 is input into the SAS® system 101 for processing. A SAS® application program 105 is executed by the SAS® system 101 to process the business data input 103 into useable information. Once the SAS® application program 105 has been executed the SAS® system 101 returns the data processing results 107 as well as a SAS® log data file 109.

Figure 2:
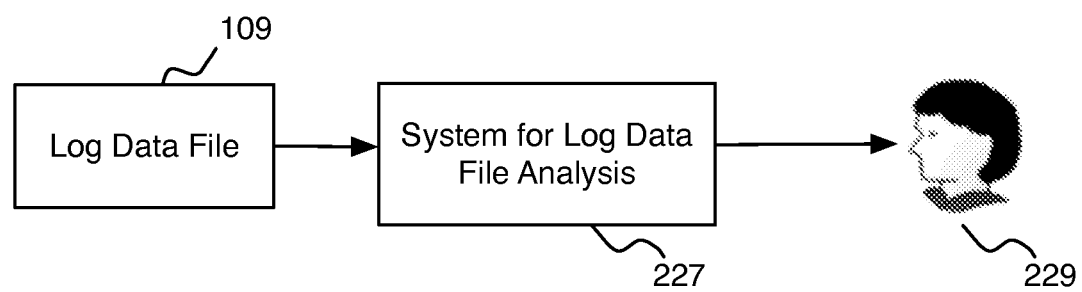
FIG. 2 is a high level block diagram illustrating the addition of a system for providing access to log data files into the operating environment of FIG. 1.

FIG. 2 is a high level block diagram illustrating the insertion of a system for providing access to log data files into the architecture of FIG. 1. The system for log data and file analysis 227 accepts the log data file 109 as input and provides a visually intuitive graphical user interface by which a user 229 may interact with the log data file 109.

Figure 3:
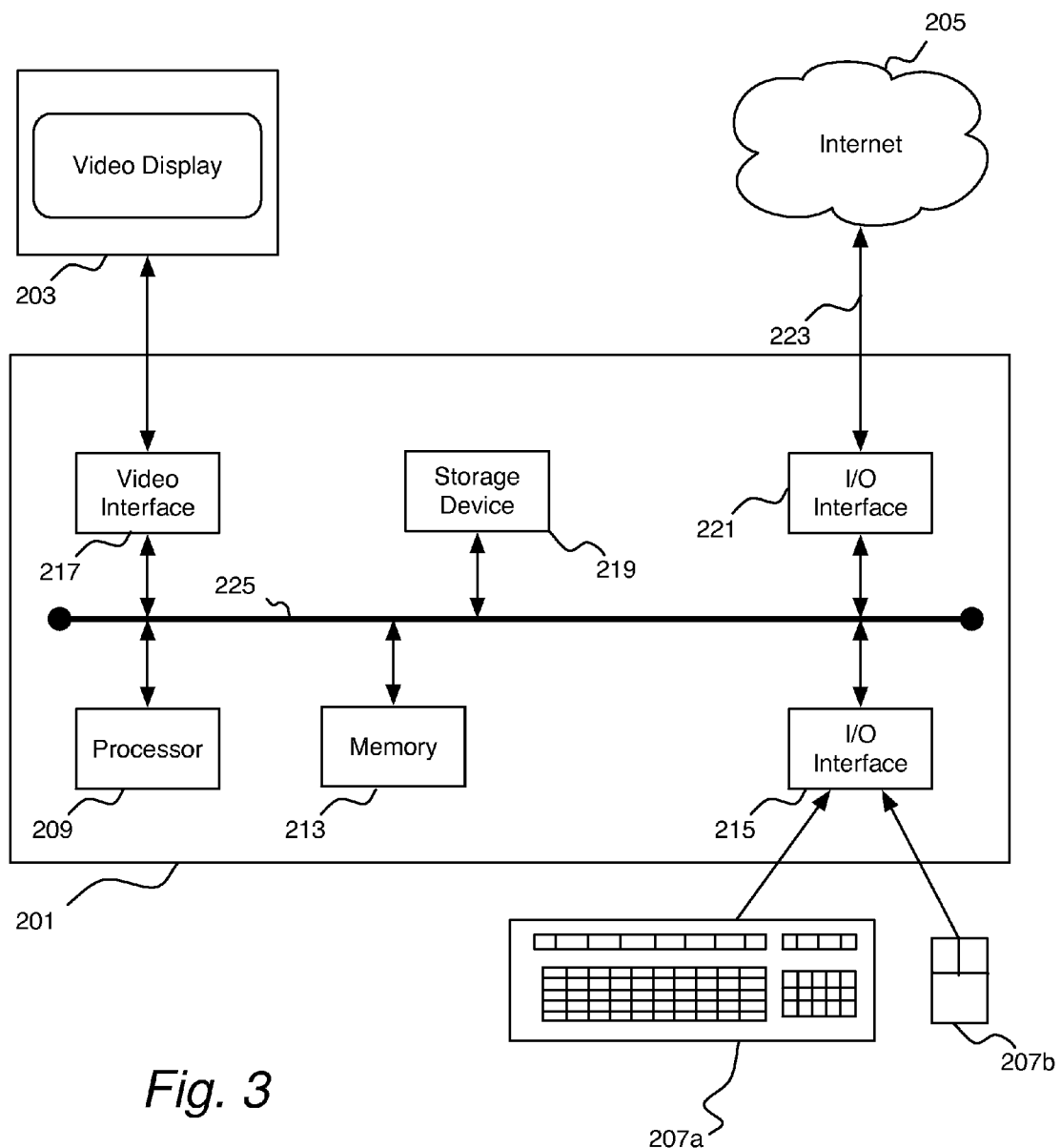
FIG. 3 is a high level overview of an illustrative example of a computer system used for executing the system for providing access to log data files introduced in FIG. 2.

FIG. 3 is a high level overview of an illustrative example of a computer system used for executing the system for providing access to log data files illustrated in FIG. 2. In a preferred embodiment, the computer 201 contains, for example, a central processing unit 209, a RAM 213, I/O interface 215 to interface with input devices for example, a keyboard 207*a* and a mouse 207*b*, a network connection 223 (e.g., WIFI, LAN) to connect to the internet 205 via an I/O interface 221, secondary storage 219 and a video interface 217 to interface for example with a video display 203, all components are connected via a serial bus connection 225.

Figure 4:
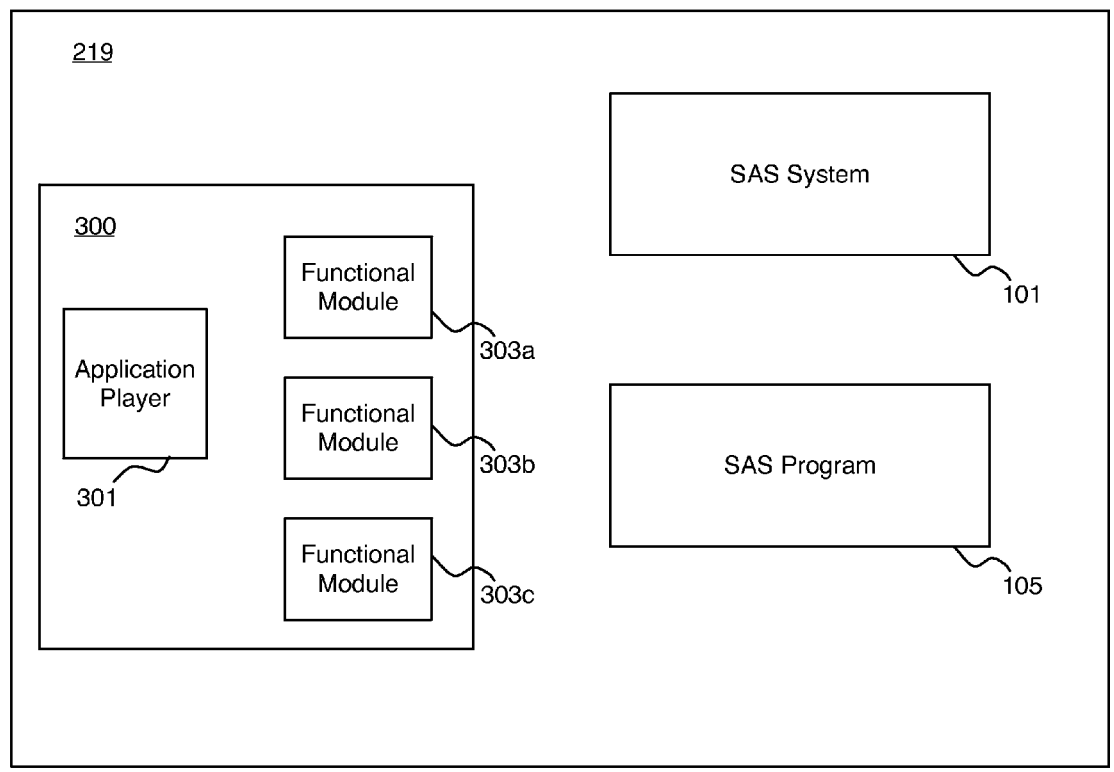
FIG. 4 is a representation of a storage device upon which the system for providing access to log data files of FIG. 2 may be stored.

The secondary storage 219 may contain software programs for controlling the operation of the computer 201 as shown in FIG. 4.

FIG. 4 is a representation of the storage device upon which the system for providing access to log data files of FIG. 2 is stored. The secondary storage 219 contains the SAS® system 101 on which the SAS® application program 105 is executed. The secondary storage 219 also contains an area 300 in which an application player 301 and associated functional modules 303*a, b*, and *c* respectively, are stored. The application player 301 is a graphical user interface through which a user may interact with the processed log data file 109 and provides access for the user to navigate the events detailed in an event list generated by the functional modules 303. The functional modules 303 contain filters to drive text parsing engines based on a user selection. Using the application player 301 as an interface, the user may select different functional modules 303 which in turn filter the log data file 109. For example, if a user wants to look at all the errors within a log data file 109 the corresponding functional module 303 deploys the appropriate filter to locate the errors and the log data file 109 is processed and the event list containing all the matching events is returned to the user via the application player 301. The application player 301 and accompanying components are discussed in greater detail herein below.

Figure 5:
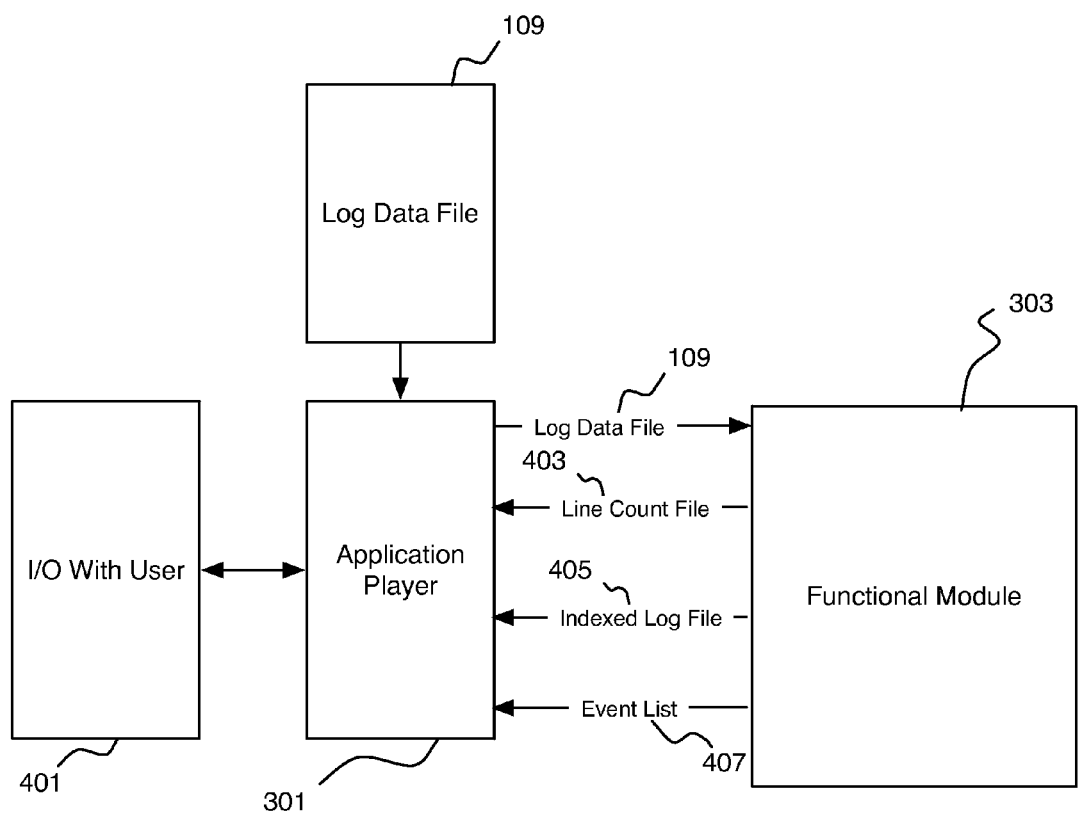
FIG. 5 is a high-level overview of the components of the system for providing access to log data files.

FIG. 5 is a high-level overview of the components of the system 227 for providing access to log data files. The user 229 of the system for providing access to log data files 227 interacts with an application player 301 via I/O interface 401 of the computer 201. The user 229 loads the log data file 109 into the application player 301 by using either the menu bar or a drag and drop method. In an alternate embodiment, described in detail hereinbelow, the log data file 109 is piped in near real-time into the application player 301. The user 229 then employs the application player 301 to select a specific functional module 303 to apply a filter to the log data file 109.

In response to command from the user 229, the application player 301 deploys the selected functional module 303, which in turn sends the log data file 109 through an appropriate text parsing engine. The functional module 303 creates the line count file 403, an indexed log file 405 and an event list 407. The application player 301, via I/O interface 401 of the computer 201, displays to the user 229 the event list 407 created by the functional module 303 based upon the initial filter criteria. The entire process is illustrated in detail in FIG. 6.

Figure 6A:
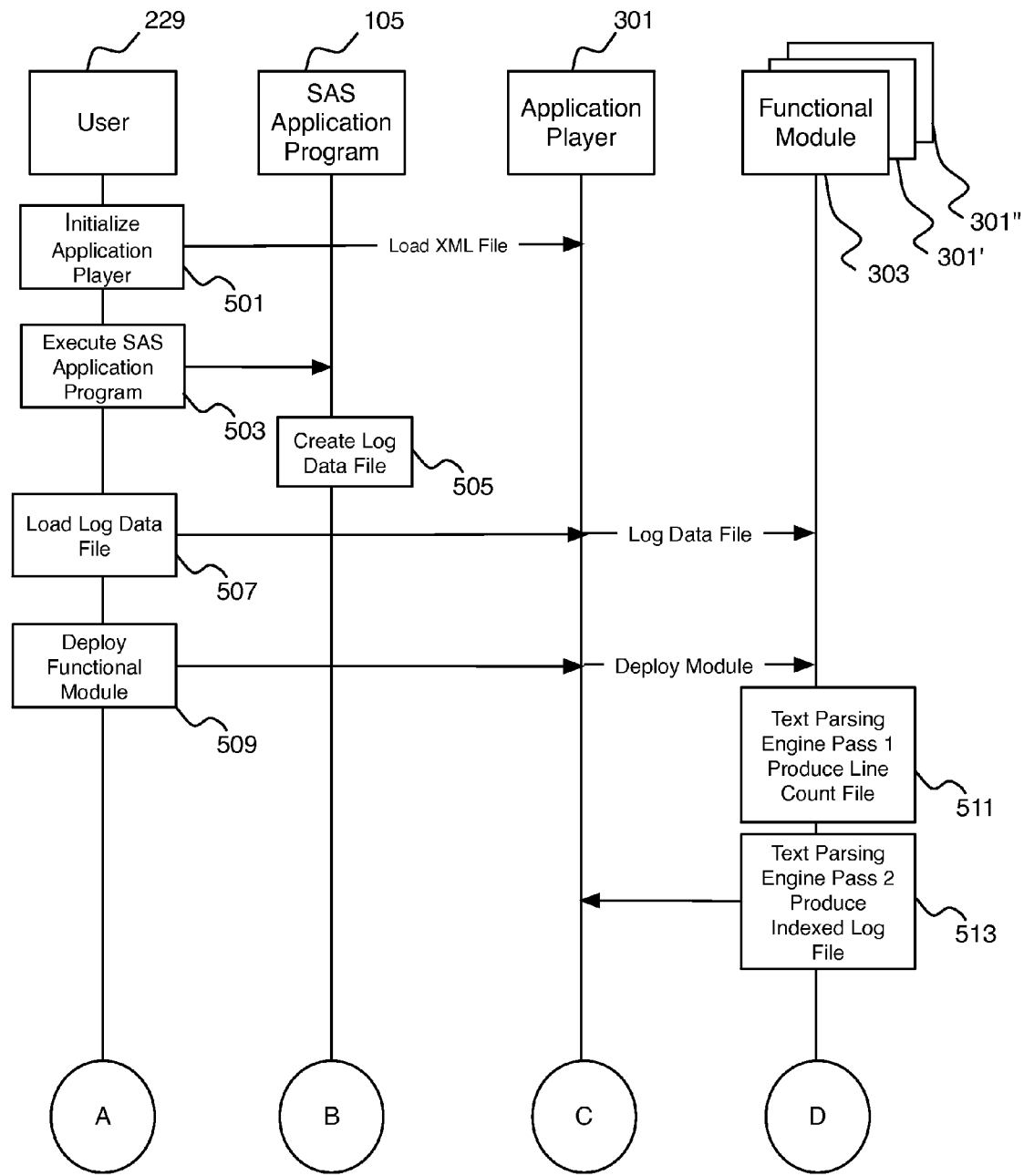
FIGS. 6 A and B are a timing sequence diagram showing the interaction between the application player and the functional module to provide a user with access to log data files.

FIG. 6 is a timing sequence diagram illustrating the interaction between the application player 301 and the functional module 303 to provide a user with improved access to log data files. When a user 229 wishes to process a log data file 109 the user 229 first initializes the application player 301. After the application player 301 has been initialized the application player 301 loads an XML file, which contains a set of instructions. The instruction set within the XML file tells the application player 301 and the functional module 303 what text strings are going to be parsed and how many instances of the parsing engine to invoke. For example, if a user 229 wishes to view all errors, warnings, division by zero and missing values, the XML file will control both what is being parsed and how many instances of the text parsing engine to launch to look for the appropriate strings. The application player 301 is designed in order to launch instances of the text parsing engine concurrently rather than consecutively in order to achieve optimal performance.

The user 229 then executes a SAS® application program 105 on the SAS® system 101, step 503. After executing, the SAS® application program 105 creates the log data file 109, step 505.

The log data file 109 is then loaded into the application player, step 507. The log data file 109 can be loaded into the application player 301 using the drag and drop functionality by which the user 229 simply drags the log data file 109 into the application player 301 or the log data file 109 can be loaded by the user 229 clicking on a File Menu at the top of the application player 301 interface. It should be noted that the entire log data file 109 is not necessarily physically stored within the functional module 303. The functional module 303 simply receives a pointer or link to the location of the log data file 109 within the application player 301. Once the log data file 109 has been loaded into the application player 301, the user 229 can select a functional module to deploy, Step 509. It should be noted that a user 229 may select multiple functional modules to deploy at one time. FIG. 6 illustrates the operation of one functional module but the process flow would be similar for multiple functional modules. After the user 229 has selected a functional module or functional modules to deploy, the functional module applies the appropriate filter through which the log data file 109 will be processed. An example of a functional module selection is to parse the log data file 109 for all the errors or warnings within the file. Apart from errors and warnings the system for providing access to log data files also provides a user 229 with the ability to scan the log data file 109 for output observation counts for all DATASTEP and PROCs contained within the log data file 109. While the functional modules for locating errors, warnings and output observation counts are discussed herein, it should be noted there are numerous functional modules that a user can deploy and the system for providing access to log data files is not limited to the two discussed functional modules.

Once the functional module 303 has been deployed, the log data file 109 is passed through two separate text parsing engines. On pass one through the text parsing engine the functional module 303 creates a line count file 403, step 511. The line count file 403 is simply a total count of the number of lines in the log data file 109. The line count file 403 is integral to the creation of the indexed log file 405.

In step 513, the log data file 109 passed through the text parsing engine for pass two. At this stage, an indexed log file 407, i.e. a log file with line numbers assigned, is created. The indexed log file 407 provides a link between the original unprocessed log data file 109 and the event list 407 that will be created in step 517.

Figure 6B:
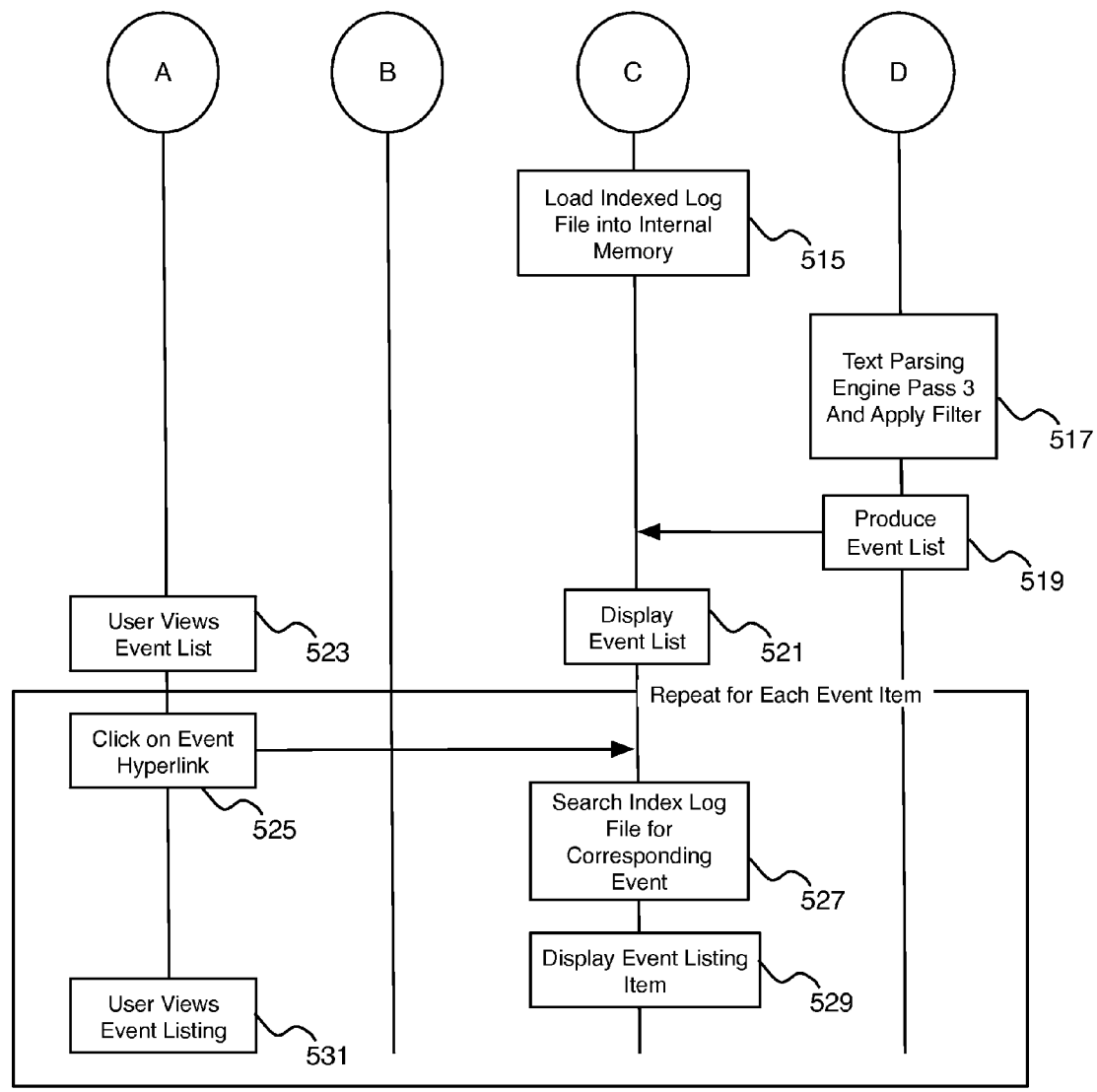

Turning now to FIG. 6B, in order to ensure faster processing of the event list 407 for the user 229, the indexed log file 405 is then sent from the functional module 303 to the application player 301 where the indexed log file 407 is loaded into the internal memory of the application player 301 for future reference, step 515.

The indexed log data file 405 is then passed through text parsing engine pass three, step 517 and a filter is applied to the log data file 109 based on the user selection criteria when the functional module was deployed in step 505. In step 517, the indexed log data file 405 is queried looking for a particular text string. The query can be performed using simple string matching techniques or can contain a more complex regular expression in order to filter the indexed log data file 405. After the appropriate filter has been applied to the indexed log data file 405, an event list is created, step 519. The event list is a list of events that match the filter criteria chosen by the user in step 505. The event list is a series of hyperlinks into the indexed log file 407. The user 229 clicks on an event hyperlink and that action causes the application player 301 to display the corresponding location of the event in the indexed log file 407. The event is displayed in an activity window of the application player 301.

The event list 407 is then sent to the application player 301 and displayed to the user 229, step 521. The event list 407 is the end product that the user 229 will navigate through the use of the application player 301. Because the indexed log file 407 has been loaded into the internal memory of the application player 301, the indexed log data file 405 acts as a link between a specific event on the event list 407 and a specific line in the original log data file 109.

Once the event list 407 has been displayed in the application player 301 the user 229 may view the event list 407, step 523. After viewing the event list 407 the user can then select to view a specific event by clicking on the event hyperlink, step 525. The application player 301 then searches the indexed log file 405 for the event corresponding to the hyperlink clicked on by the user 229, step 527. Once the event has been located within the indexed log file 405 the application player 301 displays the event listing item in the application player 301 activity window, step 529. The user 229 can then view the event listing item details, step 531. Steps 525 through step 531 then repeat for each event item user 229 wishes to view.

Figure 7A:
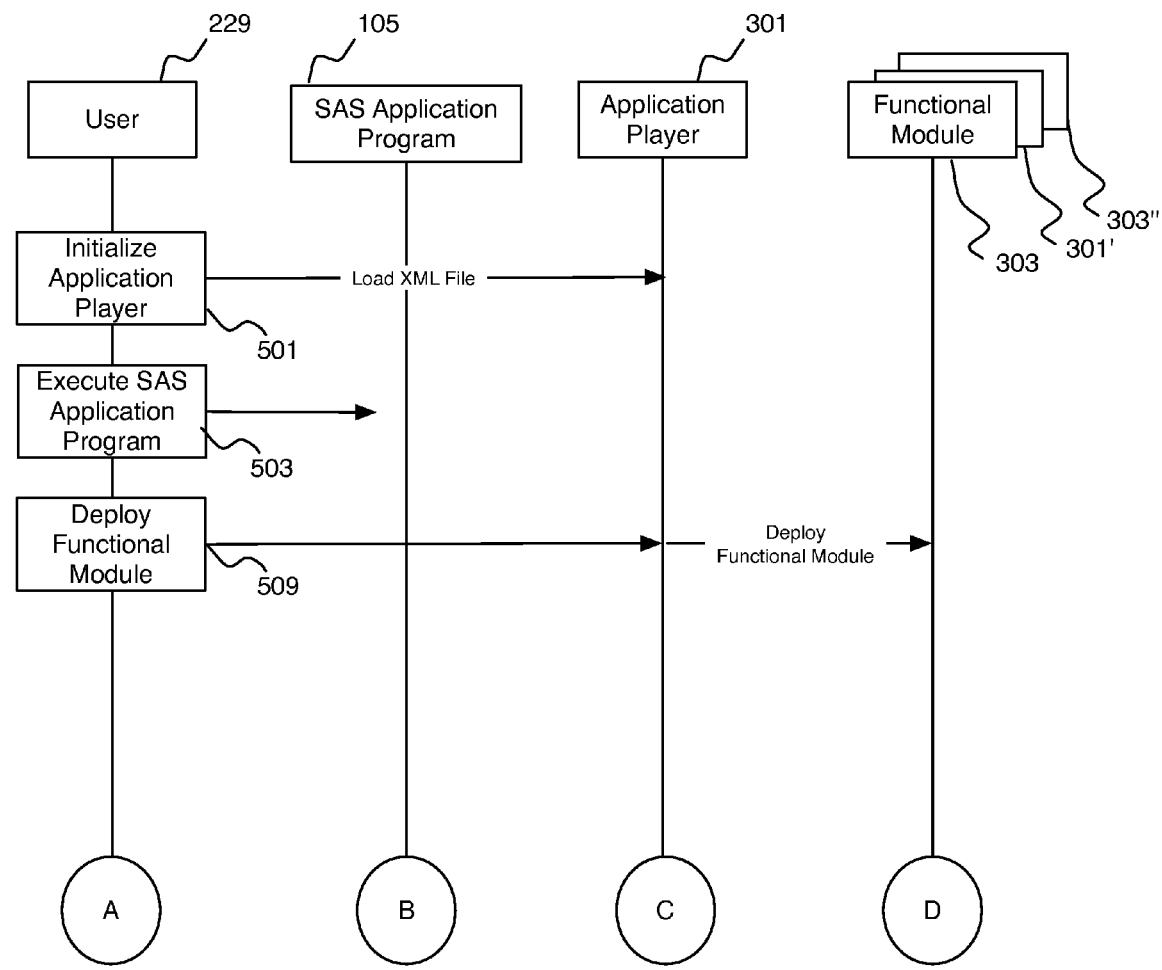
FIGS. 7 A, B and C are a timing sequence diagram showing an alternate embodiment of the system for providing access to log data files.

FIG. 7 is a timing sequence diagram showing an alternate embodiment of the system for providing access to log data files. In an alternate embodiment, the log data file 109 is loaded into the application player 301 in near-real time via a pipe. FIG. 7A depicts the first stage in the process. As with the first embodiment, the user 229 first initializes the application player 301, step 501. After initialization by the user 229 the XML instruction file is loaded into the application player 301. The user 229 then executes a SAS® application program 105 on the SAS® system 101, step 503. After executing the SAS® application program 105, the user 229 deploys a functional module 303, step 509.

Figure 7B:
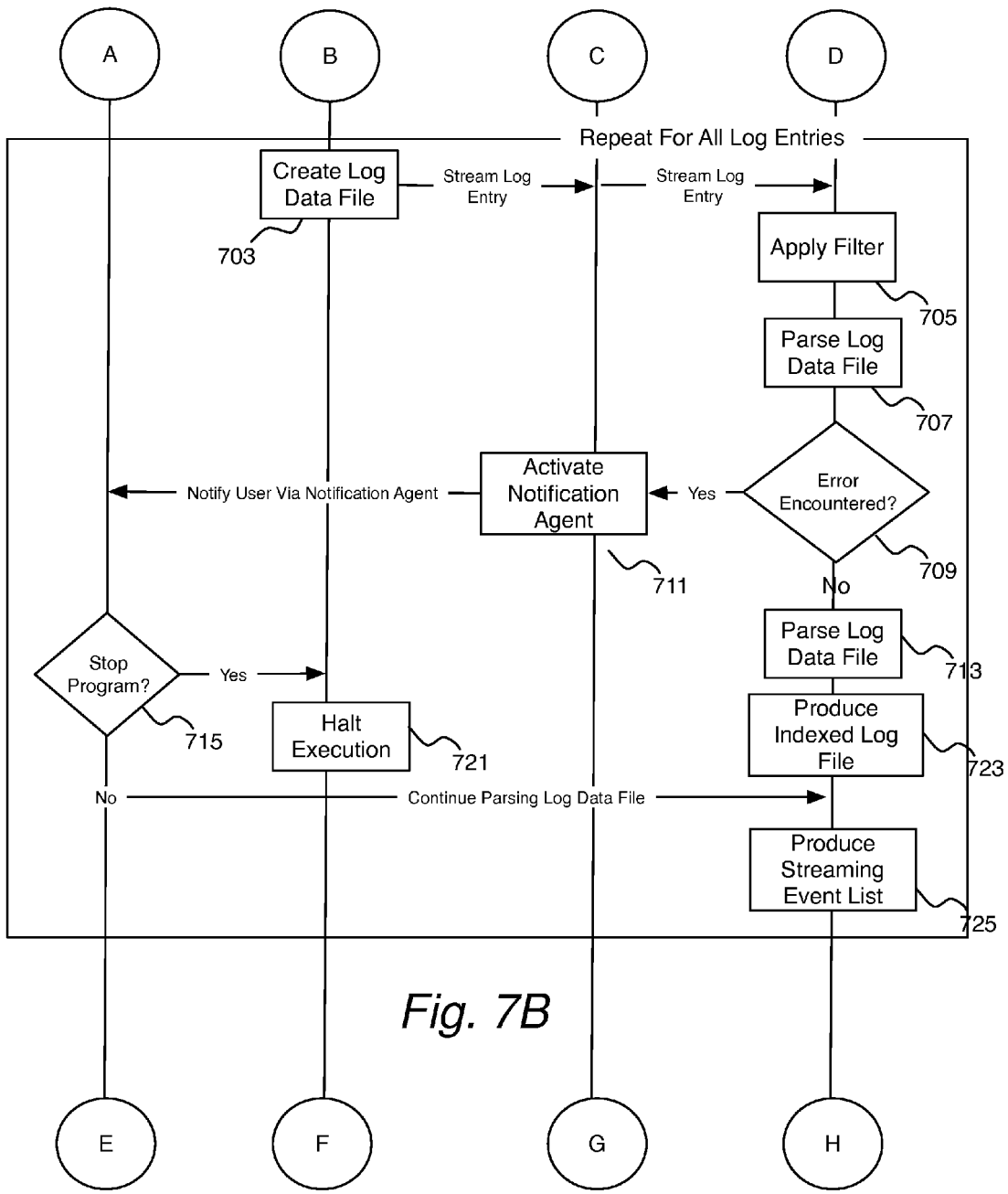

Turning now to FIG. 7B, the SAS® application program 105 creates the log data file 109 as the application program 105 is being compiled. The log data file 109 is streamed into the application player 301 who in turn passes the streaming log data into the functional module 303, step 703. In step 705 a filter based on user selection is applied to the streaming log data file 109. The streaming log data file 109 is then parsed looking for a particular text string, step 707. During decision step 709, if the parsing reveals an error message within the streaming log data file 109 the notification agent is activated, step 711. If no error message is encountered during decision step 709, the functional module 303 continues to parse the log data file 109, step 713.

In the event the notification agent is activated during step 711, the notification agent sends a message to the user 229 that an error has been encountered within the streaming log data file 109. The notification message can be SMS, electronic mail or various other forms of notification. After the user 229 has been notified that an error has been encountered, the user 229 may decide to either halt the program execution or to let the program execution continue, decision step 715. If the user 229 elects to halt the execution of the SAS® application program 105, step 721, the execution is halted and no further action by the application player is required. If the user 229 elects to continue execution of the SAS® application program 105 the streaming log data file 109 continues to be parsed by the functional module 303 and the functional module continues to produce the streaming indexed log file, step 723. After the streaming indexed log file 109 creation has begun, the functional module creates a streaming event list in step 725. The process is then repeated for all log entries until the end of file mark is reached.

Figure 7C:
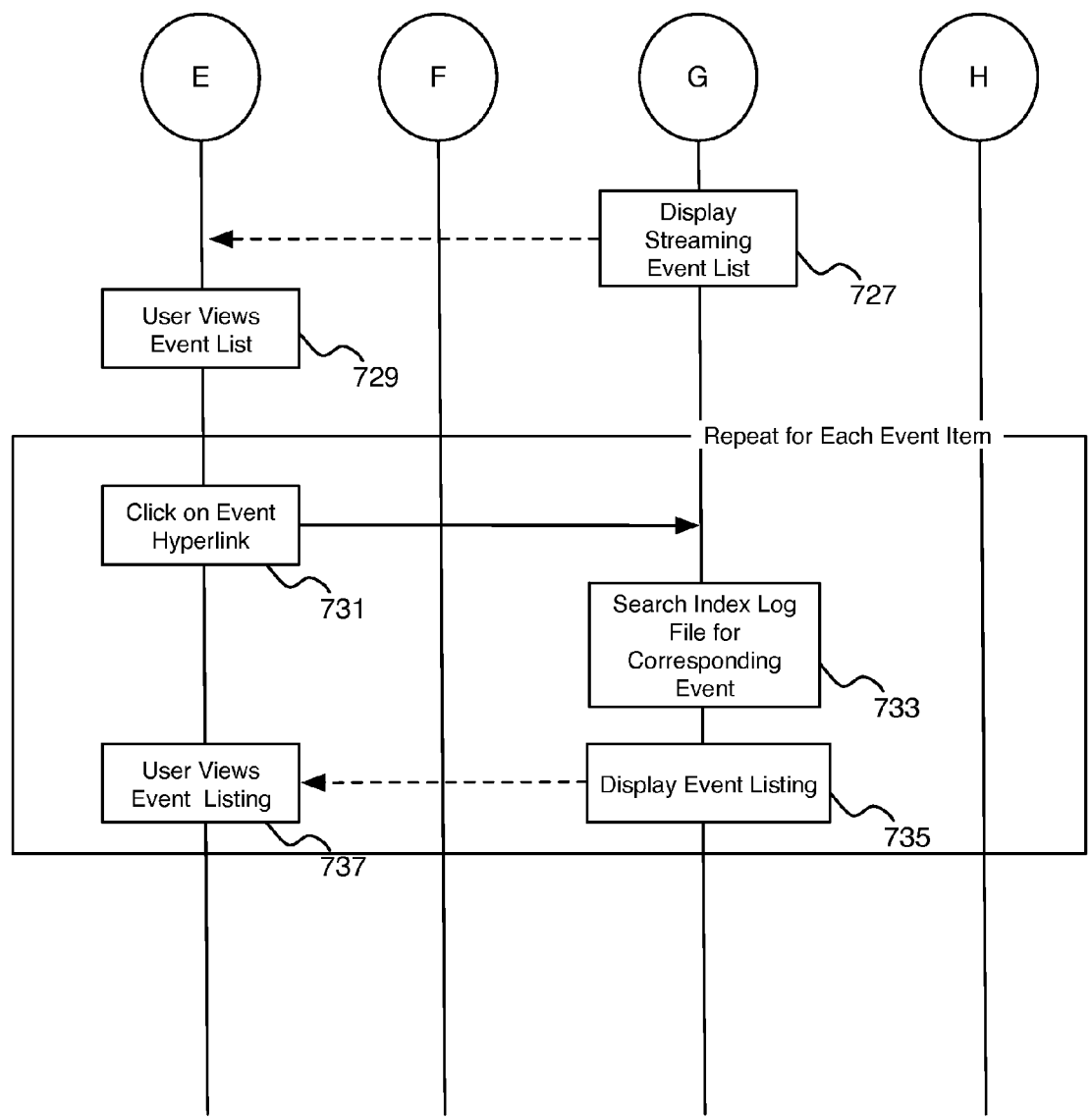

Turning now to FIG. 7C, while the streaming event list is being created by the functional module 303, the streaming event list is displayed to the user via the application player 301, step 727. The user 229 can view the streaming event list within the application player 301, step 729. The user 229 can then chose to view a particular event item by clicking on the corresponding item hyperlink, step 731. The application player 301 then searches the indexed log file for the corresponding event, step 733. The event listing is displayed to the user in step 735. The user can then view the event listing item within the application player and navigate to the corresponding log data file 109 entry, step 737. This process is then repeated for any other event items the user 229 wishes to view.

Figure 8:
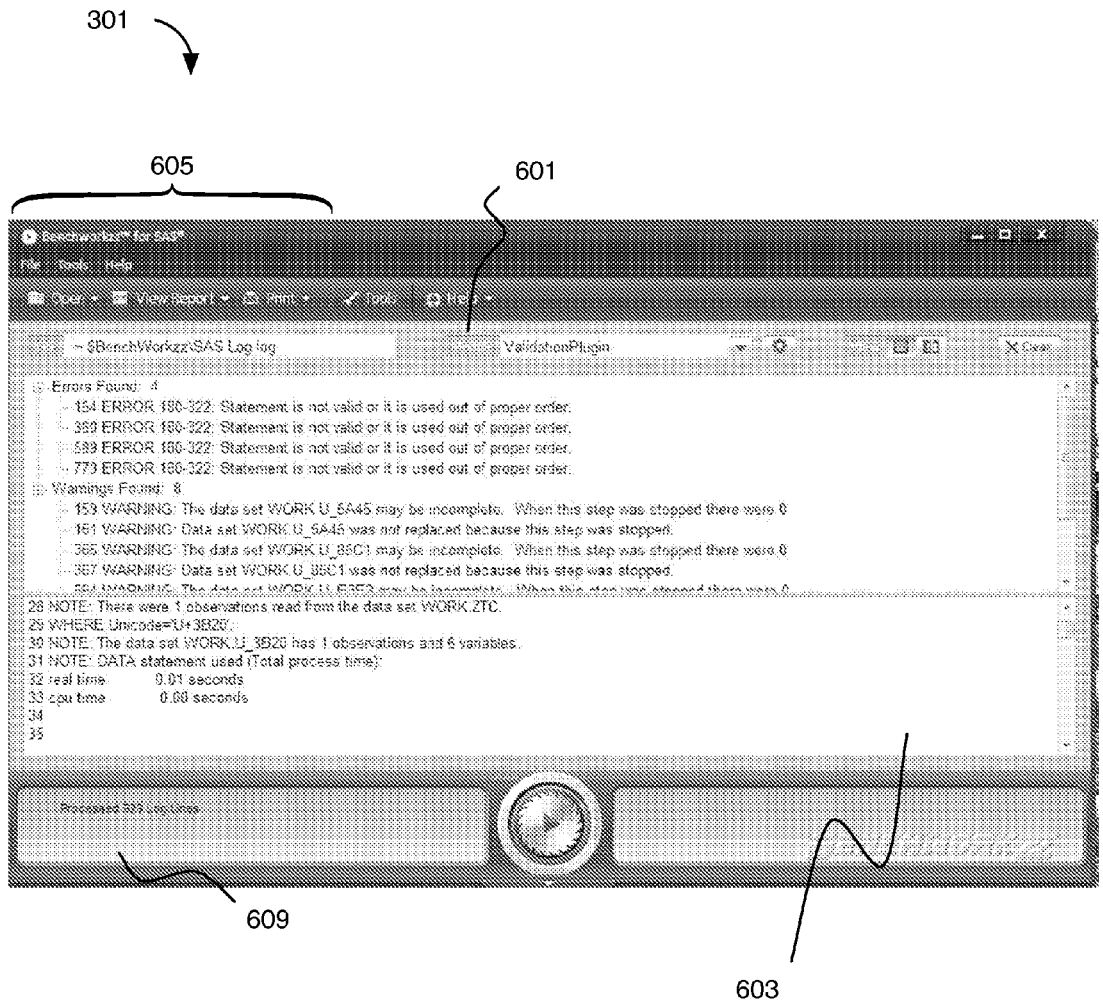
FIG. 8 is a graphical representation of the application player within the system for providing access to log data files.

FIG. 8 is a graphical representation of the application player used within the system for providing access to log data files. The application player 301 is the means by which a user can control the functional module 303 as well as interact with the event list once it is created. The application player 301 contains a menu bar at the top of the display 605, through this menu the user can select what he wants the application player 301 to do. For example, one menu choice might be "Load SAS® File". Another menu choice might be to "Exit" to leave the program altogether.

The application player 301 also provides quick links 601 to the functional modules 303. After loading a log data file 109 a user 229 can use one of the quick link 601 to access the appropriate functional module 303 without having to navigate the menu bar 605. Once the functional module 303 has created the specific event list 407 the event list 407 is displayed for the user in the application player activity display window 603. The activity display window 603 provides a way for the user to interact with the event list 407. By clicking on hyper links in the event list 407 displayed via the display window 603 the user can navigate the event list 407 in order to have interactive access to the log data file 109.

Let us now consider an example in which a static log file is processed by the system for providing access to log data files. In this example, a user 229 wishes to view all ERROR and WARNING messages found in a log data file 109. Table 1 is an excerpt of an example SAS® application program code created by the user 229.

First the user 229 executes the SAS® application program 105 on a SAS® system 101. The SAS® system 101 creates a log data 109 file produced by execution of the program. The user 229 initializes the application player 301 and the XML instruction file is loaded into the application player 301. The log data file 109 is then loaded into the application player 301 for processing by the system for providing access to log data files 227. Next the user 229 deploys the functional module 303 to access events of particular interest e.g. errors and warnings. The log data file 109 is sent through a text parsing engine for pass one and a line count file 403 is produced. The log data file 109 is then sent through the text parsing engine for pass two. During pass two, the indexed log file 405 is created. Table 2 is an example of the indexed log file 405 created for the SAS® application program illustrated in Table 1.

After the creation of the indexed log file 405, the indexed log file 405 is loaded into the application player's 301 internal memory for future reference. The log data file 109 is then passed through the text parsing engine for pass three. At this point the functional module 303 applies the filter, which was chosen by the user 229, to the data file 109. In this example, all ERRORS and WARNINGS are found in the log data file 109 for the user 229 to view. After application of the filter by the functional module 303, the event list 407 is created and sent to the application player 301 for display to the user 229. FIG. 8 is an illustration of the application player 301 complete with the event list 407 displayed in the activity display window 603. The top portion of the activity display window contains hyperlinks from which the user 229 can make a selection to view. When the user selects a particular hyperlink, for example the link corresponding to indexed log data file 405 line 154, the log data file 109 information is displayed in the bottom portion of the screen for the user 229 to review.

In this example, there is an ERROR message on line 154. The user may click on the hyperlink in the upper pane of the activity display window 603 and the information corresponding to line 154 of the indexed log data file 405 is displayed for the user 229 in the bottom pane of the activity display window 603. It should be noted that during user customization the user may elect to have a bottom pane view or view the display pane on the right hand side of the screen. By utilizing the system for providing access to log data files, the user does not have to manually search through the 929 log data file lines in order to view specific system messages.

TABLE 1

Excerpt of a SAS ® application program

```
data U_3572;
set ZTC;
where Unicode = 'U+3572';
run;
data U-38B20;
set ZTC;
where Unicode = 'U+3B20';
run;
data U-3E43;
set ZTC;
where Unicode = 'U+3E43';
length a $4.;
a = 1;
run;
data U-450B;
set ZTC;
where Unicode ='U+450B';
run;
data U-47D5;
set ZTC;
where Unicode ='U+47D5';
a+b+c;
run;
data U-5A45;
set ZTC;
where Unicode = 'U+5A45';
a;
run;
```

TABLE 2

Indexed Log File

```
98 NOTE: PROCEDURE PRINTTO used (Total process time):
        real time 0.00 seconds
        cpu time 0.00 seconds
99%include MacCode;
100 NOTE: %INCLUDE (level 1) file MACCODE is file c:\Holdcode.txt.
101+data U-3572;
102+set ZTC;
103+where Unicode = 'U+3572';
104+run;
105 NOTE: There were 1 observations read from the data set WORK.ZTC.
        WHERE Unicode = 'U+3572';
106 NOTE: The data set WORK.U_3572 has 1 observations and 6 variables.
107 NOTE: DATA statement used (Total process time):
        real time 0.00 seconds
        cpu time 0.00 seconds
108+
109+data U-3B20;
110+set ZTC;
111+where Unicode = 'U+3B20';
112+run;
113 NOTE: There were 1 observations read from the data set WORK.ZTC.
        WHERE Unicode = 'U+3B20';
114 NOTE: The data set WORK.U_3B20 has 1 observations and 6 variables.
115 NOTE: DATA statement used (Total process time)
        real time 0.01 seconds
        cpu time 0.00 seconds
116+
117+data U_3E43;
118+set ZTC;
119+where Unicode = 'U+3E43':
120+length a $4.;
121+a =1;
122+run;
123 NOTE: Numeric values have been converted to character values at places 124 given by: (Line) : (Column)
125        548:5
126 NOTE: There were 1 observations read from the data set WORK.ZTC.
        WHERE Unicode = 'U+3E43';
127 NOTE: The data set WORK.U_3E43 has 1 observations and 7 variables.
128 NOTE: DATA statement used (Total process time):
        real time 0.03 seconds
        cpu time 0.00 seconds
129+
130+data U_450B;
131+set ZTC;
132+where Unicode = 'U+450B':
133+run;
134 NOTE: There were 1 observations read from the data set WORK.ZTC.
        WHERE Unicode = 'U+450B';
135 NOTE: The data set WORK.U_450B has 1 observations and 6 variables.
136 NOTE: DATA statement used (Total process time):
        real time 0.03 seconds
        cpu time 0.00 seconds
137+
138+data U_47D5;
139+set ZTC;
140+where Unicode = 'U+47D5:
141+a + b + c;
142+run;
143 NOTE: Variable b is uninitialized.
144 NOTE: Variable c is uninitialized.
145 NOTE: There were 1 observations read from the data set WORK.ZTC.
        WHERE Unicode = 'U+47D5';
```

TABLE 2-continued

Indexed Log File

```
146 NOTE: The data set WORK.U__47D5 has 1
observations and 9 variables.
147 NOTE: DATA statement used (Total process
time):
        real time 0.01 seconds
        cpu time 0.01 seconds
148+
149+data U__5A45;
150+set ZTC;
151+where Unicode = 'U+5A45':
152+a;
153      180
154 ERROR 180-322: Statement is not valid or it is
used out of proper
155 order.
156+run;
157 NOTE: The SAS System stopped processing this
step because of
158 errors.
159 WARNING: the data set WORK.U__5A45 may be
incomplete.
160 When this step was stopped there were 0
observations and 6 variables.
161 WARNING: Data set WORK.U__5A45 was not replaced
because this step was stopped.
162 NOTE: DATA statement used (Total process
time):
        real time 0.03 seconds
        cpu time 0.01 seconds
```

Although specific embodiments of the invention have been described and illustrated, the invention is not to be limited to the specific forms or arrangements of parts so described and illustrated. The invention is limited only by the claims.

I claim:

1. A method of operating a computer system to provide a user with efficient access to a log data file created by executing a program, comprising:
   displaying, on a display of the computer system, to a user a mechanism to select one of a plurality of filter modules;
   loading the log data file into a memory of the computer system;
   operating a processor of the computer system to:
      apply a filter criteria associated with the selected filter module to the log data file;
      create an event list of events matching the filter criteria;
      create an indexed log file that provides a link between one event in the event list and a corresponding location in the log data file;
      display the event list to the user via a user interface;
      receive a selection of an event from the user via the user interface;
      use the link provided by the indexed log data file to locate a section of the log data file starting with the corresponding location and corresponding to the event, displaying the log data file at the location of the corresponding location of the selected event in the user interface.

2. The method of claim 1 wherein the log data file is created by the program before the log data file is loaded.

3. The method of claim 1 wherein the log data file is created by the program and loaded in near real-time in parallel with the creation of the log data file.

4. The method of claim 3 further comprising connecting the program and a process for executing the step of loading the log data file with a pipe, whenever the log data is transmitted as the log data file is created, over the pipe to the process executing the loading step.

5. The method of claim 1 wherein the program creating the log data file is a SAS® program, or a compiled based language such as COBOL or other system generated process log files.

6. The method of claim 1 wherein the filter comprises a regular expression.

7. The method of claim 1 wherein the user interface is an application player.

8. The application player of claim 7 further comprising instructions for driving text parsing engines stored in an XML file.

9. The application player of claim 7 further comprising the ability to send short message service messages or electronic mail messages to users.

10. The method of claim 1 further comprising:
   operating the processor according to the selected filter unit to:
      detect an error condition reported in the log data file;
      display the error condition to the user;
      provide the user with the option to terminate execution of the program; and
      in response to the user electing to terminate the program based on the reported error condition detected using the filter criteria, terminating execution of the program.

11. A computer system for providing a user with efficient access to a log data file created by executing a program; comprising:
   a central processing unit;
   a storage device connected to the central processing unit on which the central processing unit may store data and from which the central processing unit may retrieve data;
   the storage device having stored thereon instructions to cause the computer processor to electronically:
      display to a user a user interface including display of a plurality of filter units and a mechanism by which the user may select a filter units for execution;
      load a log data file;
      apply a filter criteria associated with the selected filter unit to a log data file;
      create an event list of events matching the filter criteria of the selected filter unit;
      create an indexed log data file that provides a link between an event in the event list and a corresponding location in the log data file; and
      display the event list via a user interface;
      receive a selection by the user of an event in the event list; and
      display a section of the log data file corresponding to the selected event in the event list.

12. The computer system of claim 11 wherein the log data file is created by the program before the log data file is loaded.

13. The computer system of claim 11 wherein the log data file is created by the program and loaded in near real-time in parallel with the creation of the log data file.

14. The computer system of claim 13 wherein the instructions further include instructions to cause the computer processor to connect the program and a process for executing the step of loading the log data file with a pipe, whenever the log data is transmitted as the log data file is created, over the pipe to process executing the loading step.

15. The computer system of claim 11 wherein the program creating the log data file is a SAS® program, compiled based language such as COBOL or other system generated process log data file.

16. The computer system of claim 11 wherein the filter comprises a regular expression.

17. The computer system of claim 11 wherein the user interface is an application player.

18. The computer system of claim 17 wherein the application player further comprises instructions for driving text parsing engines stored in an XML file.

19. The computer system of claim 17 wherein the application player further comprises the ability to send short message service messages or electronic mail messages to users.

20. The computer system of claim 11 wherein the application player further comprises instructions to cause the processor to:
   detect an error condition reported in the log data file;
   display the error condition to the user;
   provide the user with the option to terminate execution of the program; and
   in response to the user electing to terminate the program based on the reported error condition detected using the filter criteria, terminating execution of the program.

* * * * *